Figure 1:
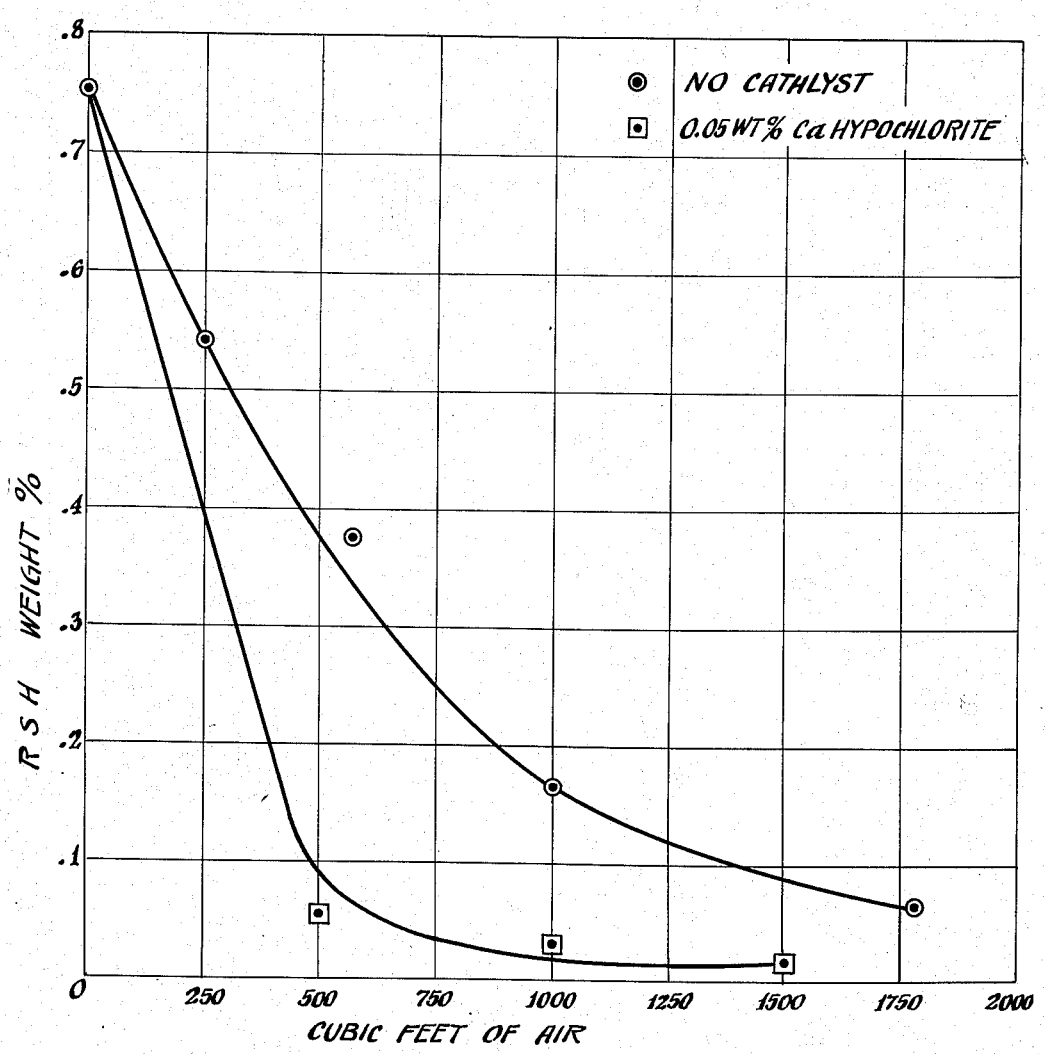

Patented Nov. 11, 1952

2,617,833

UNITED STATES PATENT OFFICE 2,617,833

DESULFURIZATION OF PHENOLS

Vladimir A. Kalichevsky and Hansford Lee Sandlin, Beaumont, Tex., assignors to Socony-Vacuum Oil Company, Incorporated, New York, N. Y., a corporation of New York Application October 3, 1950, Serial No. 188,088

10 Claims. (Cl. 260—627)

The present invention relates to the desulfurization of phenols and, more particularly, to the desulfurization of phenols obtained during the refining of petroleum oil.

For a number of years those skilled in the art have known that phenolic bodies are present in various fractions of petroleum oil and particularly in the effluent vapors of mineral oil cracking operations. A particularly rich source of phenolic bodies is the gasoline obtained by cracking suitable charge stock. In fact the supply of such phenolic bodies has become sufficiently great to have a marked effect upon the market for phenol and particularly cresols. However, as recovered the phenolic bodies obtained from such cracking operations are contaminated with sulfur-containing materials such as the higher boiling mercaptans and thiocresols from which the phenolic bodies, predominantly alkyl phenols, for example cresols must be separated.

The purification of petroleum alkyl phenols in the past has been achieved for example by treatment with aluminum halide, zinc halide or ferric halide.

It has been the practice also to purify the alkyl phenols recovered from petroleum refining operations by blowing air through an aqueous alkaline solution of the phenols before liberating the phenols by the addition of an acid. Thus, for example, a typical operation comprises passing the vapors of a gasoline fraction obtained by catalytic cracking of a gas oil through an aqueous alkaline solution of an alkali metal hydroxide. The aqueous solution of alkali metal hydroxide absorbs the alkyl phenols together with mercaptans and thiocresols. When the capability of the aqueous solution of alkali metal hydroxide has reached a practical limit the aqueous alkaline solution is said to be "spent" and is ready for treatment to recover the dissolved phenolic bodies.

Treatment of the spent aqueous solution involves separation of sulfur compounds such as sulfhydryls, i. e., in the form of alkali metal sulfide, alkali metal mercaptide and alkali metal thiocresylate from the alkyl phenols and other phenolic bodies.

One of the most practical, because of simplicity, methods for separating the sulfhydryls from the phenolic bodies comprises contacting the spent caustic solution with air under conditions which lead to the formation of organic sulfides from the mercaptides and thiophenelates. This reaction can be represented by the following equation:

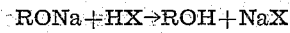

where R is an alkyl or aryl radical. The organic sulfide being relatively insoluble in the aqueous alkaline can be separated by gravity and an aqueous alkaline solution of phenolic material obtained which has a satisfactory low sulfur content.

The phenolic bodies are recovered by acidifying the disulfurized aqueous solution by passing flue gas through the solution or by adding a mineral acid such as hydrochloric or sulfuric acid.

The addition of the carbon dioxide of the flue gas or the mineral acid releases the phenolic bodies which rise to the top of the aqueous solution and can be separated by gravity or by any other suitable means. The reaction can be represented by the following equation:

$$RONa + HX \rightarrow ROH + NaX$$

It has now been discovered that the oxidation of the sulfhydryls can be accelerated by carrying out the oxidation in the presence of catalytic amounts of hypochlorites especially calcium hypochlorite.

It is to be noted that petroleum distillates have been desulfurized by means of a hypochlorite in alkaline solution since in 1903 U. S. Patent No. 723,368 issued for the desulfurization of petroleum distillates by means of a hypochlorite in alkaline solution.

Treatment with sodium hypochlorite solution is valuable primarily for sweetening straight run or other light non-cracked petroleum products. (It is to be noted that straight run gasoline and non-cracked petroleum products contain little, if any, phenols.) Successful treatment of any distillate with sodium hypochlorite so as to avoid chlorination depends on maintaining within rather narrow limits a certain definite content of free alkali. If the amount of alkali is too low, or especially if the solution is acid, chlorination takes place. The recommended range of alkalinity of the hypochlorite solution is usually from 0.5 to about 3.0 grams free caustic soda per liter of aqueous solution. The total volume of the hypochlorite solution used in treatment depends on the character of the distillate and on the degree of refining desired. For sweetening only, the consumption of hypochlorite may amount in terms of chlorine to only 2 to 3 pounds per 1000 gallons of a gasoline; but for any appreciable desulfurization of the same gasoline, the consumption may be 20 pounds per 1000 gallons in addition to other extensive treatment.

The hypochlorite treatment known to the petroleum refining industry comprised contacting the gasoline with aqueous alkaline hypochlorite solution, for example an aqueous solution of calcium hypochlorite having a free alkalinity equivalent to about 0.34 N, the treated gasoline is separated from the fouled hypochlorite solution, water washed and is then ready for storage after the addition of desired additives.

The present method of treating phenolic material distinguishes from the prior art in at least one feature; to wit; in contrast to prior art hypochlorite treatment in which gas containing free oxygen is not used, the present method has as its principal requirement the presence of large amounts of gas containing free oxygen.

The art has been taught that mercaptans can be oxidized to sulfides by oxygen, i. e., air in alkaline solution in the presence of sulfides of nickel or cobalt. Szombathy in Hungarian Patent No. 126,544 has taught that mercaptans and sulfhydryls in general can be oxidized in alkaline solution with air in the presence of polyhydric phenols such a hydroquinone and pyrogallol. Bond has taught that mercaptans can be oxidized to sulfides in alkaline solution by air in the presence of a wood tar distillate. Cauley has taught that alkyl phenols can be desulfurized by contacting an alkaline solution of the alkyl phenols containing tannic acid or tannins with air. But so far as applicants are aware no one has taught that alkaline solutions of phenols can be desulfurized by contacting with gas containing free oxygen in the presence of catalytic amounts of a hypochlorite such as calcium hypochlorite.

The present method for producing desulfurized phenols from phenols contaminated with sulfur compounds such as inorganic sulfides and mercaptides (alkyl or aryl mercaptides) comprises dissolving phenols and contaminating sulfur compounds in an aqueous solution of alkali metal hydroxide of such concentration that after solution of the phenols the free alkalinity of the solution is about 0 to about 160 grams per liter calculated as sodium hydroxide. In excess of about 0.02 weight percent hypochlorite, calculated as calcium hypochlorite and preferably about 0.05 to about 1.00 weight percent hypochlorite is added to the alkaline solution of phenols and sulfur compounds and air blown through the solution. While the air-blowing can be at atmospheric pressure, it is preferred to have the air or other free-oxygen containing gas under a pressure of up to about 80 p. s. i. g. The temperature of blowing can be about 100° F. to about 180° F. and preferably about 130° F. to about 160° F.

While it is preferred to use about 0.05 to about 1.00 weight percent hypochlorite calculated as calcium hypochlorite those skilled in the art will appreciate that the upper limit is not critical and dictated largely by economic considerations.

It is also to be appreciated that the free alkalinity of the solution is important to prevent chlorination of the product. However, the lower the alkalinity the more effective is the effect of the hypochlorite as an oxidation promoter.

Illustrative of the application of the present method to the production of desulfurized phenols, especially alkyl phenols, from petroleum is the following.

The vapors from a catalytic cracking wherein a suitable gas oil is cracked over a silica-alumina catalyst were condensed and the condensate contacted with an aqueous solution of alkali metal hydroxide. When the capability of the aqueous solution for absorbing alkyl phenols and sulfur compounds had been reduced to a practical minimum, 0.05 weight percent calcium hypochlorite was added and the spent solution blown with air at about 150° F. until the sulfur content was reduced to a satisfactory minimum. The sulfur compounds produced during the air-blowing rose to the top of the aqueous solution when the latter was quiescent and were readily separated therefrom.

The desulfurized aqueous solution was then treated with sufficient acid to set free the phenols which rose to the top when the mixture was quiescent and were readily removed.

Figure 2:
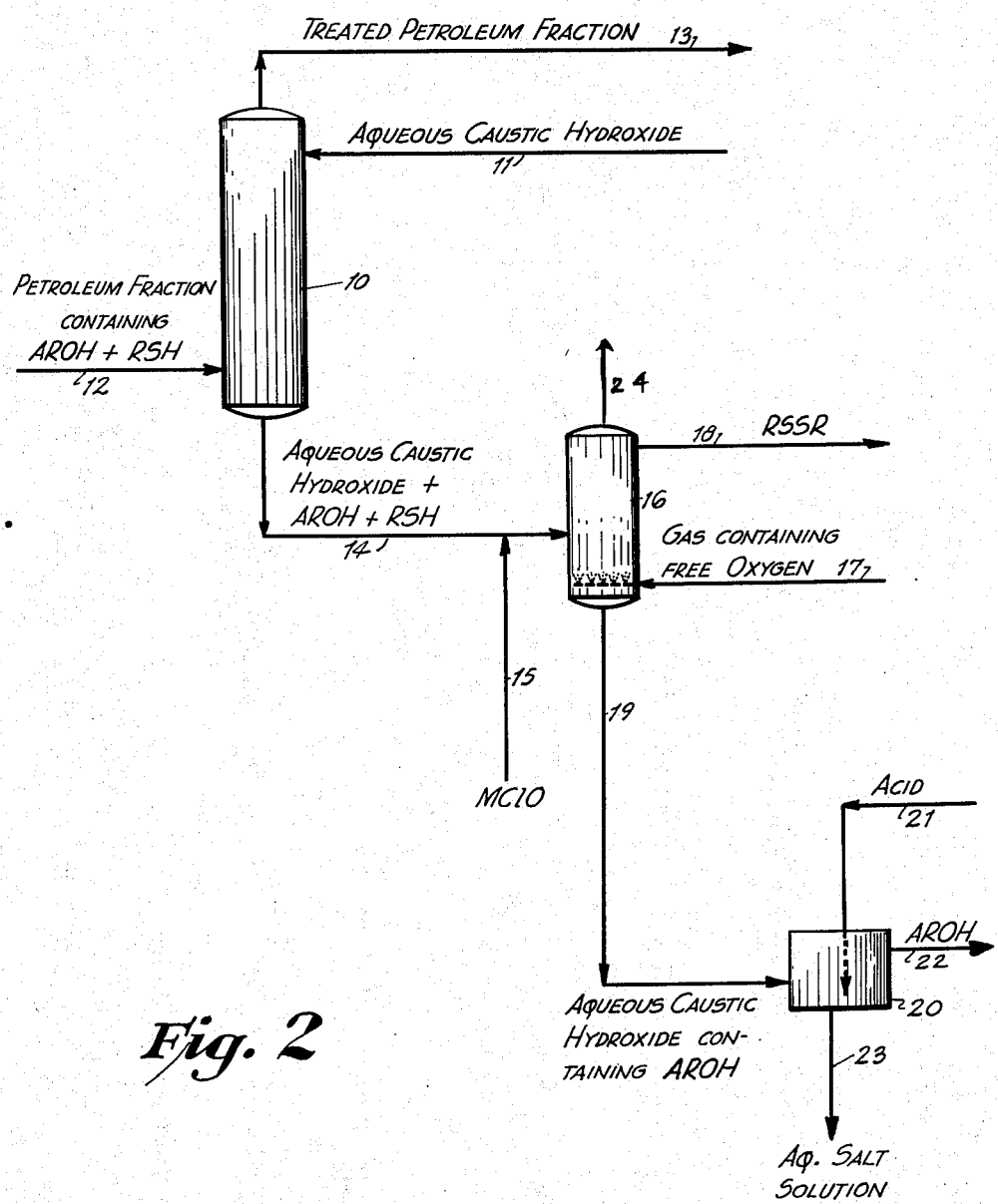

Thus, a hydrocarbon fraction containing alkyl phenols and mercaptans can be treated to obtain substantially pure alkyl phenols in a manner diagrammatically represented by the flow sheet Figure 2. Aqueous caustic hydroxide having a gravity of about 10° to about 35° Bé. is introduced into container 10 through line 11. Container 10 is of suitable type in which an intimate contact between two substantially immiscible liquids can be obtained. A petroleum fraction containing alkyl phenols (AROH) and aliphatic and/or aromatic sulfhydryls (RSH) is introduced through line 12 into container 10. The petroleum fraction rises through the aqueous alkaline solution and during its flow upward through container 10 is stripped, at least in part, of its phenols and sulfhydryls by the aqueous caustic solution. The treated petroleum fraction leaves container 10 through line 13. The aqueous caustic solution with the phenols and mercaptans stripped from the petroleum leaves container 10 through line 14. A metal hypochlorite such as calcium hypochlorite is introduced into the aqueous caustic hydroxide solution containing phenols and sulfhydryls in line 14 through line 15 in catalytic amounts to provide a concentration of at least 0.02 weight per cent hypochlorite calculated as calcium hypochlorite. The aqueous caustic hydroxide solution containing phenols, sulfhydryls and hypochlorite flows through line 14 to container 16 which is of any suitable type in which contact could be made between a gas and the aqueous caustic solution. A gas containing free oxygen is introduced through line 17 into container 16. The gas flows upwardly through the aqueous caustic solution and in passage therethrough oxidizes the mercaptans to polysulfides, (RSSR), the gas escaping from container 16 through line 24. After the sulfhydryls have been converted to polysulfides, the polysulfides rise to the top of the aqueous solution and are drawn off through line 18. The aqueous caustic solution substantially devoid of sulfhydryls containing the phenols is withdrawn from container 16 through line 19 to vat 20. In vat 20 sufficient reagent such as sulfuric acid or acidic gas such as flue gas is introduced through line 21 in amounts sufficient to spring or release the phenols from the caustic solution. The phenols rise to the top of the aqueous solution and are drawn off through line 22, the aqueous solution of the salts of the alkali metal hydroxide is withdrawn from vat 20 through line 23. Since substantially all of the sulfhydryls have been separated from the aqueous caustic solution in container 16, it follows that the phenols sprung in vat 20 are substantially devoid of sulfhydryls.

Suitable starting solutions are aqueous solutions of sodium hydroxide having a gravity of 10 to about 35° Bé., aqueous solutions of potassium hydroxide having a gravity of about 10 to about 50° Bé.

Spent aqueous solutions of phenols and contaminating sulfur compounds have a gravity of about 7° to about 30° Bé. and a free alkalinity of about 0 to about 160 grams per liter (0 to about 1.3 pounds per gallon).

One virtue of the present method of desulfurizing phenols in alkaline solution in the presence of catalytic amounts of hypochlorite is the marked reduction in the volume of oxygen-containing gas required to desulfurize the phenols. The volume of air, for example, required to desulfurize a solution of given sulfur content is reduced as much as 65% by the use of catalytic amounts of hypochlorite. This is manifest from a comparison of the amount of air required to reduce the RSH content of an alkaline solution of phenols from 0.75 weight percent to a given mercaptide concentration.

Seven liters of spent caustic solution were blown with air at 15 p. s. i. g. and 150° F. Seven liters of the same spent caustic solution were blown with air at 15 p. s. i. g. and 150° F. after the addition of 0.05 weight percent calcium hypochlorite. The sulfur content was reduced as shown by the data in Tables I and II:

TABLE I

*(No hypochlorite)*

| Air, ft.³ | Na₂S, Wt. Percent | RSH, Wt. Percent | Gravity, °Bé. @ 60° F. |
|---|---|---|---|
| 0 | 0.037 | 0.75 | 20.5 |
| 250 | None | 0.54 | 20.4 |
| 560 | None | 0.38 | 20.4 |
| 1,000 | None | 0.165 | 20.5 |
| 1,771 | None | 0.071 | 20.5 |

TABLE II

*(0.05 wt. percent Ca hypochlorite)*

| Air, ft.³ | Na₂S, Wt. Percent | RSH, Wt. Percent |
|---|---|---|
| 0 | 0.037 | 0.75 |
| 500 | None | 0.055 |
| 1,000 | None | 0.029 |
| 1,500 | None | 0.011 |

The values for weight percent RSH given in Tables I and II were plotted as in the accompanying drawing; the circles being used for the data of Table I and the squares for the data of Table II. From the curves so obtained the amount of air required to reduce the RSH content to 0.6, 0.5 etc. weight percent was estimated for the desulfurization in the absence of added catalyst and for desulfurization in the presence of added hypochlorite. These values are presented in Table III:

TABLE III

*Cubic feet of air*

| RSH, Wt. Percent | A—No Catalyst | B—0.05 wt. Percent Ca(ClO)₂ | B/A |
|---|---|---|---|
| 0.6 | 175 | 100 | .572 |
| 0.5 | 300 | 175 | .583 |
| 0.4 | 450 | 250 | .556 |
| 0.3 | 640 | 325 | .507 |
| 0.2 | 875 | 400 | .457 |
| 0.1 | 1,415 | 485 | .343 |

We claim:

1. A method of desulfurizing phenols contaminated with mercaptans which comprises oxidizing said mercaptans in alkaline solution in the presence of a catalytic amount of a hypochlorite.

2. A method of desulfurizing phenols contaminated with mercaptans which comprises contacting an aqueous alkaline solution containing phenols and mercaptans with gas containing free oxygen in the presence of a catalytic amount of calcium hypochlorite.

3. A method of desulfurizing phenols which comprises contacting an aqueous alkaline solution containing phenols and mercaptans with gas containing free oxygen in the presence of a catalytic amount of hypochlorite.

4. A method of desulfurizing phenols which comprises contacting an aqueous alkaline solution containing phenols and mercaptans with gas containing free oxygen in the presence of a catalytic amount of calcium hypochlorite.

5. A method of desulfurizing phenols which comprises contacting an aqueous alkaline solution containing phenols and mercaptans with air in the presence of about 0.05 weight percent calcium hypochlorite.

6. A method for producing desulfurized phenols from petroleum fractions which comprises contacting a petroleum fraction containing phenols and mercaptans with an aqueous solution of alkali metal hydroxide to obtain a fat solution containing alkali metal hydroxide, phenols and mercaptans, separating said fat solution from said treated fraction, adding a catalytic amount of a hypochlorite to said fat solution, contacting said fat solution containing hypochlorite with gas containing free oxygen to convert said mercaptans into sulfur containing compounds substantially insoluble in said aqueous solution, separating said substantially insoluble sulfur compounds from the aqueous solution, acidifying said aqueous solution to produce free phenols and separating said free phenols.

7. A method for producing desulfurized phenols from petroleum fractions which comprises contacting a petroleum fraction containing phenols and mercaptans with an aqueous solution of alkali metal hydroxide to obtain a fat solution containing alkali metal hydroxide, phenols and mercaptans, separating said fat solution from said treated fraction, adding a catalytic amount of calcium hypochlorite to said fat solution, contacting said fat solution containing hypochlorite with gas containing free oxygen to convert said mercaptans into sulfur containing compounds substantially insoluble in said aqueous solution, separating said substantially insoluble sulfur compounds from the aqueous solution, acidifying said aqueous solution to produce free phenols and separating said free phenols.

8. A method for producing desulfurized phenols from petroleum fractions which comprises contacting a petroleum fraction containing phenols and mercaptans with an aqueous solution of alkali metal hydroxide to obtain a fat solution containing alkali metal hydroxide, phenols and mercaptans, separating said fat solution from said treated fraction, adding about 0.05 weight percent of calcium hypochlorite to said fat solution, contacting said fat solution containing hypochlorite with gas containing free oxygen to convert said mercaptans into sulfur containing compounds substantially insoluble in said aqueous solution, separating said substantially insoluble sulfur compounds from the aqueous solution, acidifying said aqueous solution to produce free phenols and separating said free phenols.

9. In the process of desulfurizing phenols which comprises contacting an aqueous alkaline solution containing phenols and mercaptans with air until the mercaptan-sulfur content thereof is reduced to a given value and separating the polysulfides thereby formed from said aqueous alkaline solution, the improvement which comprises adding not more than a catalytic amount of a hypochlorite to said aqueous solution before contacting with air and then contacting said aqueous alkaline solution with not more than about 0.6 as much air as required in the absence of said catalytic amount of hypochlorite to reduce the mercaptan-sulfur of said aqueous solution to said given value.

10. A method of desulfurizing phenols which comprises contacting an aqueous solution containing phenols, mercaptans and about 0.02 to about 1. weight per cent of hypochlorite and having a free alkalinity of up to about 160 grams per liter calculated as sodium hydroxide with gas containing free oxygen until the mercaptan-sulfur content has been reduced to a given value and polysulfides are formed, and separating said polysulfides from said aqueous alkaline solution.

VLADIMIR A. KALICHEVSKY.
HANSFORD LEE SANDLIN.

REFERENCES CITED

The following references are of record in the file of this patent:

UNITED STATES PATENTS

| Number | Name | Date |
|---|---|---|
| 2,134,390 | Greensfelder et al. | Oct. 25, 1938 |